Patented Feb. 5, 1929.

1,701,084

UNITED STATES PATENT OFFICE.

WILLIAM D. RICHARDSON AND ROY C. NEWTON, OF CHICAGO, ILLINOIS, ASSIGNORS, BY DIRECT AND MESNE ASSIGNMENTS, OF ONE-HALF TO SWIFT & COMPANY, OF CHICAGO, ILLINOIS, A CORPORATION OF ILLINOIS, AND ONE-HALF TO ALBERT MUSHER, OF WASHINGTON, DISTRICT OF COLUMBIA.

FOOD PRODUCT.

No Drawing.   Application filed August 4, 1925.   Serial No. 48,138.

This invention relates to a new fat product of normally solid consistency and containing normally solid or semi-solid fat. The invention includes a new method of producing said product as well as the product itself.

The new fat product contains the normally solid or semi-solid fats mechanically admixed with other ingredients without melting the fat so that the particles of the fat in the final product, instead of being in the form of globules, are in irregular shapes such as thin ribbons or laminations or threads in intimate admixture with the other ingredients. In its preferred embodiment the new product contains the fat intimately admixed with the other ingredients in such a way that, when heated to melt the fat, the product assumes its state of an emulsion without appreciable fat separation.

The new product, in one of its embodiments, is intended as a concentrated or solid salad dressing capable of being brought to a fluid consistency by the addition of a fluid vehicle such as oil or water or both together. The new product can also be used for other purposes, such as spreading on bread to make sandwiches, etc.

In making the new product we use a blend or mixture of oils or fats of normally solid consistency such as may be made, for example, by adding to ordinary salad oil enough solid fats to bring the mixture to the consistency of firm butter or to such a consistency that it will be solid at ordinary temperatures. In producing such a solid mixture, we make use of various oils and fats in varying proportions. Such oils and fats as olive oil, cotton-seed oil, corn oil, peanut oil, cocoanut oil, oleo oil, oleo stock, oleostearin, neutral lard, hydrogenated or partially hydrogenated oils and other edible vegetable and animal oils may be used. The ingredients of the mixture are so proportioned and blended as to give a product of the desired solid consistency, e. g., of a melting point of 80 to 110° F. for ordinary purposes. A somewhat lower or higher melting point may, however, be used, depending upon such considerations as the temperature and the climate of the place in which the product is to be shipped or used. In summer, for example, a somewhat stiffer formula, containing a somewhat increased amount of solid fats, may be used, while in winter, the amount of solid fat may be somewhat reduced to give a somewhat softer product.

In making the new solid salad dressing or other product the mixture of oils and fats of normally solid consistency is utilized without heating or melting and is compounded directly, in its normally solid state, with the other ingredients. For making a solid salad dressing, other ingredients desired in the salad dressing are used such as condiments, eggs, etc. The formula or composition used in making the new concentrated or solid salad dressing may vary, much as different salad dressings commonly vary, but with the employment of the blended solid fat mixture in place of the usual salad oils. The other condiments such as vinegar, lemon juice, salt, pepper, mustard, sugar, etc., will be used in the desired proportion, together with eggs and other suitable ingredients, such as emulsifying agents, etc.

Having selected the various ingredients, the mixture of oils and fats is taken in its normally solid consistency, together with the condiments, eggs and other ingredients, such as emulsifying agents, etc., and the whole is subjected to an operation which may be referred to as an emulsifying operation although it does not directly produce a product in emulsion form. The mixture can be introduced into a low temperature emulsifier operating under pressure, e. g., an apparatus in which the material is kneaded under pressure and forced through fine perforations which bring about a further kneading action, and the mechanical operations are continued until a uniform intermixture is obtained of the fat and other ingredients, with the fat subdivided into minute pieces or particles intimately distributed throughout the other ingredients.

The preliminary mixing may be carried out in a mixer of the ordinary dough type, and a fairly good mixing of the ingredients may be obtained, but this mixing is not sufficient to form an emulsion-like product. This preliminarily admixed product can, however, be subjected to a further treatment somewhat similar to that of emulsification, but without melting the normally solid fat. An advantageous method of effecting the further mixing is to introduce the mixture under pressure into a stone mill. The pressure can be supplied by a cylindrical tube or hopper of sufficient height feeding the stone mill, or other means for applying pressure can be used such as a cylinder and piston actuated by air.

When emulsion-like products are made in the cold of solid or semisolid products, the emulsion is not of the usual type containing one phase of the emulsion in a fine globular form, but contains the fats in an irregular shape. When the emulsion-like product is made in a stone mill, it is of the film type and might be likened to thin ribbons or irregular shapes of one phase lying against thin ribbons or irregular shapes of the other phase. When the product is formed by thorough kneading and forcing through fine perforations, the mechanical form may depart somewhat from that of ribbons and may be more or less string-like in character. The test of a solid emulsion-like product of this type is the melting test, in which, on melting, the ribbon or film or other structure is lost and one of the phases assumes a globular form. When the product is sufficiently intermixed and formed into a solid emulsion-like product, it can be carefully melted without appreciable fat separation, forming what may be considered a more or less true emulsion.

The solid concentrated salad dressing of the present invention is somewhat similar to the salad dressing of our prior application Serial No. 35,011 filed June 4, 1925, and may be made of the same or similar ingredients to those referred to in said application. The new process is distinguished from that of said prior application by the use of the normally solid fat mixture in its normally solid form, instead of by melting the mixture, emulsifying the product while the fat mixture is melted, and then cooling and solidifying the product. The new product, moreover, while it may be of similar composition as to ingredients as the product of our prior application, is distinguished therefrom in its physical structure and composition, as above pointed out.

The new product possesses similar advantages to the product of our prior application. It is a normally solid product that may be handled much as butter is handled in the sense that it may be cut or stamped into prints, as by wire cutting or by a mechanical print machine. It can be marketed in the form of a brick or print. It may be packaged in a suitable carton, in the form of a brick or print from which a suitable amount can be sliced off at will.

The new product, moreover, although it contains the fat in an irregular form, such as a laminated form, may nevertheless be diluted with a suitable liquid to give a product similar to ordinary salad dressing in consistency. The new product thus enables a marked economy to be obtained in cost of transportation, and in weight of product to be shipped and stored.

In using the new concentrated salad dressing, a portion of the solid product may be sliced off with a knife, introduced into a suitable vessel, and worked with a suitable quantity of oil or water, or both together, as desired, with a spoon, fork, or egg beater. Instead of using oil and water, other liquid diluents or ingredients such as cream, lemon juice, etc. may also be used. In order to facilitate this diluting and mixing operation, the solid product may first be softened by heat, or softened at the same time the fluid admixture is being made and the mixture is being worked together. An egg beater or other suitable mechanical device may be used to facilitate the mixing operation. Depending upon the dilution of the concentrated or solid product, the salad dressing obtained may be of a fluid consistency or may be of a more viscous or pasty consistency.

The concentration and ingredients of the concentrated or solid product can be varied. The ingredients are preferably adjusted so that from 1 to 2 parts of oil or water to 1 part of the new concentrated or solid product will produce a salad dressing of customary consistency and flavor. The new concentrated product may thus be considered a double strength or triple strength salad dressing. Such a multiple strength salad dressing makes it possible to make an amount of ordinary salad dressing therefrom equal to, e. g. 2 or 3 times the amount of the solid product used.

Ordinary salad dressing as now marketed is of fluid or pasty consistency and requires a container, such as a bottle, suitable for a product of such consistency. The new product of the present invention is of normally solid consistency, and may advantageously be packaged in pasteboard cartons with a paper lining much as butter is packaged. Such packages may be, for example, of 1-pound size, or may be ¼-pound or other fractional size, while the new product may also be packaged in larger packages, e. g., in 5-pound packages. The larger size packages permit of cutting off slices of varying thickness to give any desired weight to the new product. Similarly the slices so cut off and sold to the customer may be in turn cut into thinner slices or into smaller pieces for use as desired in making salad dressing of normal consistency. The smaller size individual packages may similarly be used by the purchaser in cutting from the solid product contained in the package the desired amount of concentrated product for use in making a salad dressing of normal consistency. The invention thus provides both a new commercial product in the form of a concentrated product of solid consistency, and a new commercial package product in the form of a carton, such as a paste-board carton, containing the new product of normally solid consistency.

The new product can be varied in its composition, and in the amount and proportion of the various ingredients incorporated in it. While, by using a salad dressing composition, a product can be obtained suitable for use as a concentrated salad dressing, the product can be made for other purposes and various ingredients can be incorporated with it. For example, cheese of one kind or another can be incorporated in the product to give it a cheese-like taste, e. g., Roquefort cheese or other cheese. So also peanut butter and the like can be incorporated in the product to modify its composition and taste. Seasoning and flavoring materials of various kinds can also be incorporated so that the product can be used in its normally solid state for spreading on bread to make sandwiches having a pleasing and characteristic taste. Owing to the large content of fat which the new product contains, e. g., more than 50%, it forms a valuable food product, supplying valuable food fats of normally solid or semi-solid consistency together with other ingredients which make the product valuable for preparing sandwiches and the like of desirable taste.

It will thus be seen that the present invention provides a new fat product of a composite character of a normally solid consistency which is of an emulsion-like character but in which the fat is intimately admixed with and distributed throughout the other ingredients in an irregular form, such as in the form of thin films, strings, etc. It will further be seen that this product when sufficiently intermixed and combined by mechanical operations can be heated to melt or liquefy the fat without material fat separation to give an emulsion product. This product is advantageously made with salad dressing constituents to give a solid concentrated salad dressing capable of being diluted with a suitable liquid to give a salad dressing of the ordinary consistency. The product is adapted for use for other purposes, however, such as for making sandwiches, etc.

We claim:

1. A concentrated, solid salad dressing containing a blend of oils and fats of normally solid consistency and spices, salt, vinegar and the like in the form of an emulsion-like product, said product containing the normally solid blend of oils and fats in the form of minute, irregular particles intimately distributed throughout the salad dressing and said product being capable of being brought to a fluid condition by stirring with a suitable liquid to form a liquid salad dressing.

2. A concentrated, solid salad dressing containing a blend of oils and fats of normally solid consistency and spices, salt, vinegar and the like in the form of an emulsion-like product, said product containing the normally solid blend of oils and fats in the form of laminæ intimately distributed throughout the salad dressing, said product being self-sustaining at ordinary temperatures and being capable of being heated to melt the normally solid fat particles without destroying the emulsion-like character of the product.

In testimony whereof we affix our signatures.

WILLIAM D. RICHARDSON.
R. C. NEWTON.